Feb. 19, 1952      P. HALPERT      2,586,034
AIRCRAFT AUTOMATIC PILOT
Filed Feb. 23, 1946
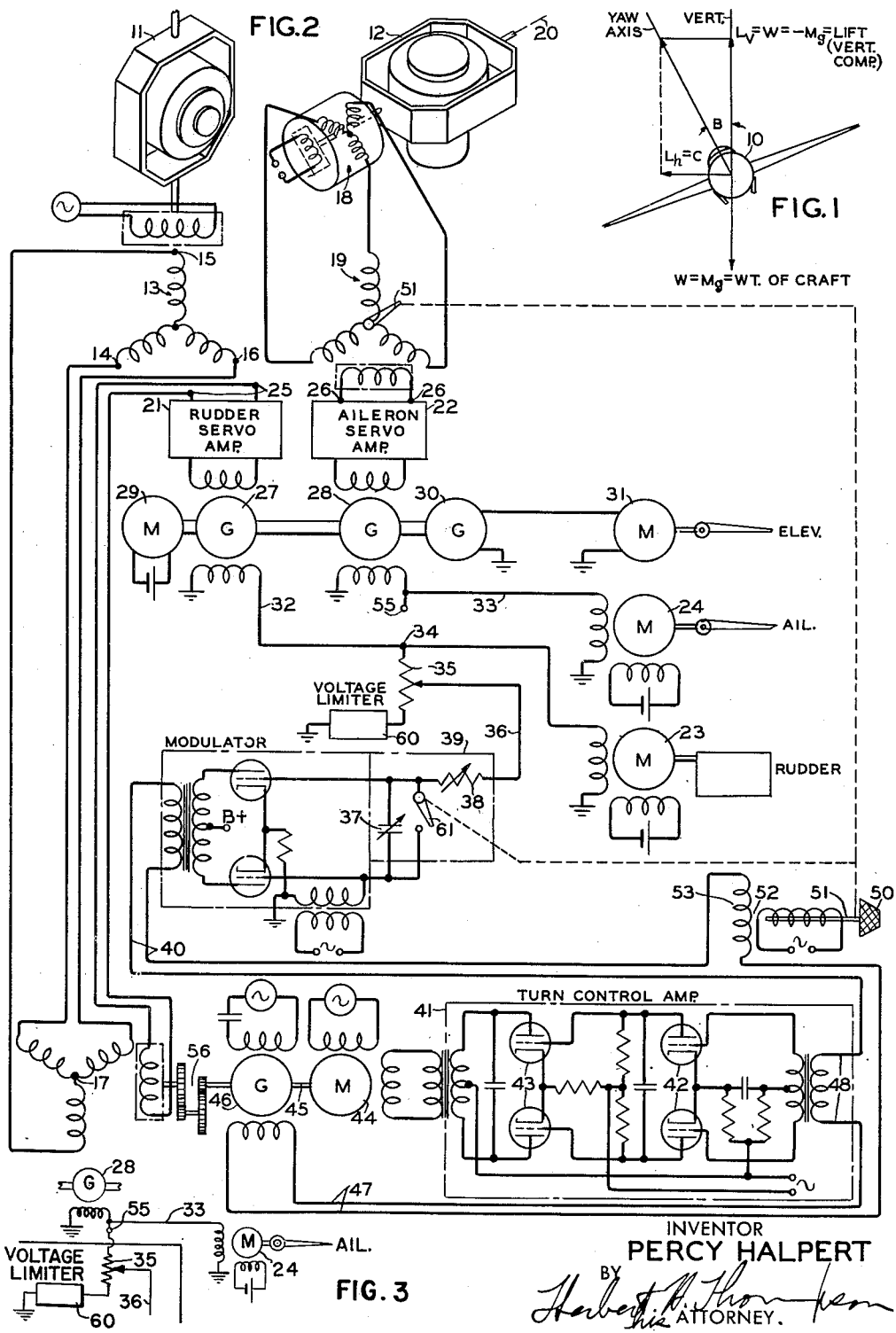
INVENTOR
PERCY HALPERT
BY Herbert A. Thompson
his ATTORNEY.

Patented Feb. 19, 1952

2,586,034

UNITED STATES PATENT OFFICE 2,586,034

AIRCRAFT AUTOMATIC PILOT

Percy Halpert, Hempstead, N. Y., assignor to The Sperry Corporation, a corporation of Delaware Application February 23, 1946, Serial No. 649,601

9 Claims. (Cl. 244—77)

The present invention relates to improvements in aircraft automatic pilots and, more particularly, to automatic pilots including means for executing coordinated turns.

Automatic pilots for aircraft generally include a directional gyroscope for establishing a stable heading reference, a gyro vertical or artifical horizon for establishing a stable vertical reference, and servo or positional control systems responsive to the indications of the gyros and operative through suitable relays or amplifiers to control the rudder, ailerons and elevator in a manner to stabilize the aircraft in some predetermined heading and attitude.

It is desirable to be able to employ the automatic pilot not merely for stabilizing the aircraft in straight flight, but also for making turns under automatic control. Automatic turns offer the possibility of being made smoother than manually controlled turns (especially at the beginning and end of the turn) and, furthermore, automatic turns can be made with high precision, a valuable feature in airport approach and landing maneuvers and likewise in certain military maneuvers.

Execution of perfect turns under automatic control is a problem of considerable difficulty, especially when the wide range of rates of turn and air speeds encountered in modern aircraft is considered. Turn coordination requires a correct adjustment of three variables: rate of turn, air speed and bank angle. Unless these variables are correctly correlated, the aircraft will sideslip or skid, for reasons more fully described below. These conditions not only make for discomfort to the passengers but also, if they are not corrected, may result in putting the aircraft in a dangerous attitude.

According to the present invention, there is provided apparatus for automatically making coordinated turns, that is, turns which are free from sideslip or skid, over a wide range of bank angles, rates of turn and air speeds. The discovery on which the invention is based is that in a turn made under control of an automatic pilot, any error in coordination will reveal itself as a persistent signal in the output of the rudder or aileron servo control system, or both, and that this signal can be employed to adjust the rudder in a manner to reduce the rudder signal to zero and thereby coordinate the turn.

The apparatus for performing coordination of turns according to the invention operates smoothly and effectively in practice to make coordinated turns under a wide variety of flight conditions. Adjustments are readily made to adapt the apparatus to aircraft of different characteristics and also to obtain a desired mode of functioning in any particular aircraft. Although the apparatus responds to sideslip and skid and corrects these conditions, it does so without need for pendulums, wind vanes or other direct measuring devices, since the sideslip or skid signal is obtained from the servo system of the automatic pilot. A significant saving in complication and weight, and improvement in performance are thereby achieved.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

This application is related to prior application of applicant, Carl A. Frische, and Jefferson R. Wilkerson, now Patent No. 2,415,430, dated February 11, 1947, for Automatic Pilot with Automatic Banking.

The invention and the principles on which it is based are illustrated in the accompanying drawings, in which Fig. 1 is a diagram showing the relations obtaining between bank angle and other quantities in an aircraft during a turn, and Fig. 2 is a diagrammatic showing of a specific embodiment of apparatus within the purview of the invention.

Fig. 3 is a fragmentary wiring diagram showing a modified form of the invention.

As an aid to an understanding of the invention, there is shown in the diagram of Fig. 1 the relation between bank angle and other quantities existing in the case of an aircraft, indicated at 10, during a turn.

An aircraft in straight and level flight represents an equilibrium of forces wherein drag is balanced by thrust, and weight by the vertical component ($L_V$) of the lift. Lift L is the component of the resultant force acting on an aircraft in a direction at right angles to the relative wind. In straight and level flight L is vertical and is equal to the weight of the aircraft, $Mg$.

To make a turn, the aircraft is banked to some angle B (in a level turn, the angle between vertical, and the normally-vertical axis of the aircraft; or what amounts to the same thing, the angle between a line through the wing tips and horizontal). This action establishes a horizontal component of lift $L_h$ which furnishes centripetal force $C$ to make the aircraft turn at some rate $S$. The function of $L_h$ is analogous to the function of a string in the case of a stone being whirled; it constrains the object to a circular path in lieu of its normal straight path.

Centripetal force $C = L_h = MV^2/R = MVS$ where $M$ is the mass of the aircraft and $V$ is the true air speed. Since $\tan B = L_h/L_v = L_h/Mg$, then $\tan B = VS/g$, where $g$ is the acceleration of gravity. Thus for a given bank angle and air speed one definite rate of turn is required if the necessary centripetal force is to be obtained. If the above relation between $B$, $V$, $S$ and $g$ is departed from, sideslip or skid will occur as there will be too little or too great a centripetal force. The expression for the proper rate of turn is $S = g \tan B/V$.

For the above relations to hold exactly, the lift $L$ of the aircraft is assumed to be increased to a value $L'$ as by adjustment of the elevator so as to keep the vertical component of lift, $L_v$, the same as in level flight.

In the present invention, means are provided responsive to incorrect turn conditions and operative to adjust $S$ in a manner to correct the conditions.

As shown in Fig. 2, the apparatus of the invention includes a heading or turn reference, such as a directional gyro 11 and a level reference in both bank and pitch, such as gyro vertical 12, both of which are mounted in an aircraft 10 shown diagrammatically in Fig. 1. The directional gyro is provided with a pickoff or synchro 13 shown as of the Selsyn transmitter type, which is connected via leads 14, 15 and 16 with a second signal transformer Selsyn 17, by adjustment of which the angular relation between the aircraft and the gyro can be changed at will to fly any desired heading or to make turns in a manner to be described. The gyro vertical is provided at 18 and 19 with a similar pair of Selsyn pickoffs on the roll axis 20, for control of the aircraft in roll or bank (the pitch pickoffs not being shown).

The outputs of pickoffs 17 and 19 are delivered via leads 25, 26 to servo relays or amplifiers 21, 22 of conventional type, which in the system shown are arranged to control rudder and aileron servomotors 23, 24 through the agency of a motor-generator set of the Ward-Leonard type. Thus, the outputs of the amplifiers energize the field circuits of the direct current generators 27 and 28, the armature circuits of which energize the servomotor armatures via leads 32 and 33 and ground. The servomotor fields are energized from a constant source. The generators are driven by a motor 29.

In the system so far described, deviation of the aircraft from a heading or bank angle predetermined by the settings of Selsyns 17 and 19 is detected by the gyros and corrected by the rudder and aileron servo systems in a known manner.

A similar pickoff system (not shown) is usually provided for the pitch axis of the gyro vertical, to control the elevator servo generator 30 and servomotor 31.

According to the present invention, the rudder servo energization lead is tapped at 34 and the rudder signal employed to adjust the rate of turn in a sense to make the rudder signal zero.

The rudder signal is taken off via a potentiometer 35 and applied by way of lead 36 to an integrating network comprising capacitance 37 and resistance 38. The output of the network is then fed to a modulator 39. The purpose of the modulator is to obtain an alternating output voltage at 40 of amplitude and phase corresponding to the amplitude and polarity of the direct current signal at 35.

A turn control amplifier 41 is provided including amplifying tubes 42, 43, the output of which drives a motor 44, the shaft 45 of which carries the stator of Selsyn 17, through reduction gearing indicated at 56. The motor also drives a generator 46, the output of which is supplied via leads 47 to the input 48 of the amplifier, so as to make the speed of the motor accurately proportional to the amplifier signal.

A turn control knob 50 is provided which is adapted on displacement from zero or detent position to turn the aileron Selsyn 19 so as to cause the aircraft to roll or bank and thereby initiate a turn. Selsyn 19 is actually mounted on the knob shaft 51 but is shown removed therefrom for clarity. The knob also operates a signal generator 52 so constructed and arranged as to supply at 53 a voltage of amplitude and phase corresponding to the amount and sense of the displacement of the knob. That is, the voltage at 53 is proportional to the bank angle set in by the knob.

A switch 61 is provided, operable from the turn knob and arranged to short-circuit condenser 37 and thereby render the error correction circuit inoperative except when the knob is positioned to initiate a turn.

Leads 53 are connected in series with the modulator output leads 40 and the amplifier input, as shown.

The factor of proportionality between voltage 53 and the amount of bank set in by knob 50 depends on the relation $B = \tan^{-1} VS/g$, and ordinarily adjusted so that this relation will be satisfied at the minimum cruising speed of the aircraft for which the apparatus is intended. However, if desired, the adjustment can be with respect to any other air speed since error is corrected in any case.

A voltage limiter 60 is advantageously inserted between resistor 35 and ground, to permit the use of very high sensitivity to errors in turn rate and to limit the amount of charge on condenser 37 to the point where the modulator overloads, which will further insure short period stabilization and long period error correction. The limiter may take the form of a pair of copper oxide rectifiers connected back to back or other circuit elements having a non-linear current-voltage characteristic.

In operation, to make a turn, the knob 50 is displaced so as to bank the aircraft, thereby initiating a turn. A voltage appears in leads 53 as described, which is amplified in 41 and which drives motor 44 at a rate proportional to the voltage. The motor rotates Selsyn 17 at some rate which corresponds to the correct rate of turn for the minimum air speed, but which will be low for air speeds greater than this.

If the aircraft is turning at the correct rate, the rotation of Selsyn 13 relative to the directional gyro is exactly matched by the rotation of Selsyn 17 by the motor, and the output at 25 is zero. Hence, under such conditions there is no signal at the rudder servo amplifier and the rudder remains centralized.

On the other hand, if the rate of turn is incorrect for the particular bank angle and air speed, Selsyn 17 rotates at a different rate from that of Selsyn 13 relative to the gyro and a signal appears at 25 which causes deflection of the rudder.

This rudder signal picked off at 34 is converted to alternating current by modulator 39 as described, and is supplied to the amplifier input so that it is added to or subtracted from the turn knob signal, and thus changes the speed of turning of Selsyn 17 until the output at 25 approaches zero. The turn is then properly coordinated.

The error correction system of the invention likewise affords full correction for the so-called gimbal error characteristic of directional gyros as ordinarily mounted. During a banked turn at a rate which actually is constant with respect to the earth, the movement of the aircraft relative to the gyro does not take place at a constant rate. Instead, it is retarded and accelerated in a cyclic manner, the maxima and minima occurring at certain orientations of the aircraft relative to the gyro, the amount or amplitude of the variations varying with a trigonometric function of the bank angle. The gimbal error can thus give rise to spurious signals which would tend to change the rate of turn when such adjustment is improper. In the present apparatus all departures of the absolute rate of turn in space about the true vertical axis from that required for non-skid turns are detected by appearance of a rudder displacement signal for the rudder servomotor 33 and the rate of turn set up on the variable speed motor M is varied accordingly to maintain such true rate of turn. The airplane, therefore, even though banked steeply, will execute a smooth, uniform turn at the proper banking angle, which prior art apparatus did not successfully do.

In practice, the apparatus of the invention functions satisfactorily to make coordinated turns over a range of bank angles, rates of turn and air speeds which is sufficient to take the requirements of a wide variety of military and civilian aircraft.

The apparatus is simple and reliable and is easy to adjust. The rapidity of the correction of rate of turn upon appearance of a given rudder signal is determined by the setting of potentiometer 35 in combination with adjustment of resistance 38 and capacitance 37. In general these constants are adjusted so that several seconds are required for a rudder signal to become fully effective to change the rate of turn. This makes it possible for short period deviations of the aircraft due to gusts which last a fraction of a second up to a second or two, to be corrected by the gyro and servo system in the usual way, while a persistent rudder signal is corrected in the manner described.

Although the invention has been described with principal reference to correction of the rate of turn in response to a persistent rudder signal, it is advantageous in some cases to correct the rate of turn in response to a persistent aileron signal. In an incorrectly coordinated turn, the ailerons attempt to correct the turn by changing the banking angle by displacing the ailerons from their normal or neutral position. The aileron signal can be tapped at 55, as by connecting potentiometer 35 to this point instead of to point 34 as shown in Fig. 3.

Since sideslip or skid is detected as continuous rudder or aileron signal and said signal is brought to zero by adjustment of the rate of turn of the turn Selsyn motor, it is not strictly necessary so far as coordination during the turn is concerned, that an arbitrary turn signal be applied to the turn control amplifier from the turn knob. That is, signal generator 52 and leads 53 could be omitted. However, provision of elements 52 and 53 as described is very desirable partly because the load on the circuit 34—38—39—40 is thereby reduced and partly because use of the rudder aids considerably in initiation and in termination of a turn. That is, while an aircraft can be put into a turn merely by banking, there usually exists an initial condition known as adverse yaw which renders such an operation irregular or rough. On banking to the left, for example, there is a tendency for the aircraft to initially yaw to the right before a left turn is set up. A similar action takes place on coming out of a turn. Momentary use of the rudder helps to overcome adverse yaw and urge the aircraft smoothly into the desired turn. Afterwards the rudder can properly be centralized, as is done in the present invention.

In conventional aircraft, the members for controlling heading and bank angle take the form of rudder and ailerons, respectively. However, the invention is not restricted to use with such control surfaces. For example, in multi-engine aircraft the throttles can be employed to aid in steering, and in certain other aircraft spoilers are used to supplement the ailerons in banking. The present invention is applicable to any kind of servo system capable of responding to signals from the steady references and of applying control moments to the aircraft in response thereto.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an automatic control system for aircraft having control members for turn and bank and including heading and bank reference means and servo means normally energizable therefrom for adjusting the control members in a sense to maintain level flight at a predetermined heading on deviation therefrom, variable speed means for causing a turn of the aircraft at some rate, manual control means for setting simultaneously both predetermined angle of bank and an approximately correct rate of turn through said variable speed means, and auxiliary control means comprising a device responsive to a persistent turn servo energization signal, and means operated thereby for causing a slow continuous adjustment of variable speed means and rate of turn until said turn servo energization signal disappears.

2. In an automatic control system for aircraft having control members for heading and bank angle and including heading and bank reference means and servo means normally energizable therefrom for adjusting the control members in a sense that restores the craft to the heading and level determined by the reference means, means for operating one of the servo means to cause the craft to yaw, means for operating the other of the servo means to cause the craft to bank, variable speed means for causing turn of the craft at a predetermined rate, manually operable means for simultaneously setting the bank operating means to bank the craft at a desired angle and to cause rotation of said variable speed means to initiate a turn at a rate approximately corresponding to the bank angle, and means responsive to persistent energy supplied one of said servo means operative because of a difference in the actual and desired rate of turn to change the rate of rotation of said turn operating means when in disagreement with the rate of turn of the craft.

3. In an automatic control system for aircraft having control members for heading and bank angle and including heading and bank reference means and servo means normally energizable therefrom for adjusting the control members in a sense that restores the craft to the heading and level determined by the reference means, means for operating one of the servo means to cause the craft to yaw, means for operating the other of the servo means to cause the craft to bank, variable speed means for causing turn of the craft at a predetermined rate, manually operable means for simultaneously setting the bank operating means to bank the craft at a desired angle and to cause rotation of said variable speed means to initiate a turn at a rate approximately corresponding to the bank angle, and means responsive to persistent energy supplied the heading adjusting servo means operative because of a difference in the actual and desired rate of turn to change the rate of rotation of said turn operating means when in disagreement with the rate of turn of the craft.

4. In an automatic pilot for aircraft having aileron and rudder control surfaces, servo means for controlling the ailerons, servo means for controlling the rudder of the craft, a single control means including means for setting in a desired angle of bank for controlling both said servo means to effect a desired bank of said craft and simultaneously a turn at a proportionate rate, and means for automatically modifying the preset rate of turn of the craft upon persisting deflection of one of said surfaces from norm to eliminate such deflection.

5. In an automatic pilot for aircraft having aileron and rudder control surfaces, servo means for controlling the aileron, servo means for controlling the rudder of the craft, a single control means including means for setting in a desired angle of bank for controlling both said servo means to effect a desired bank of said craft and simultaneously a turn at a proportionate rate, and means for automatically modifying the preset rate of turn of the craft upon persisting rudder deflection to eliminate such deflection.

6. Means for obtaining correctly banked turns in an automatically piloted aircraft including a course maintaining device, an attitude maintaining device, means for setting in a desired banking angle and setting up a proportionate rate of turn through said attitude device and course device respectively, and means responsive to departure of the craft's rate of turn from the rate of turn so set up for altering the latter until such rates are matched.

7. In an automatic pilot for aircraft having control members for positioning the craft about its turn and bank axes, a heading and a bank reference, signal means operated by relative changes in attitude of the craft and said references, servo means controlled by the output of said signal means normally operative to move said control members in a sense to maintain the craft to a predetermined position about its turn and roll axes defined by the respective references, manually operable means for both modifying the output of the signal means of the bank reference and the heading reference to cause the craft to bank at a desired angle and to turn at an approximately corresponding rate, and means responsive to persistent displacement of one of said servo means for readjusting the rate of turn initially set up by said manual turn effecting means.

8. In an automatic pilot for aircraft having control members for positioning the craft about its turn and bank axes, gimballed gyroscopic heading and bank level references, signal means operated by relative changes in attitude of the craft and said references, servo means controlled by the output of said signal means normally operative to move said control members in a sense to maintain the craft in a predetermined position about its turn and roll axes defined by the respective references, manually operable means for simultaneously modifying the output of the signal means of the bank reference and the turn reference to cause the craft to bank at a desired angle and to turn at an approximately corresponding rate, and means subsequently responsive to signals causing rudder deflection from norm for varying such rate of turn in a direction to eliminate such signals, whereby variations in the absolute rate of turn of the craft caused by gimbal error and the heading references during steep banks are prevented and uniform turns secured in the proper rate for the bank angle set in.

9. In an automatic pilot for aircraft having aileron and rudder control surfaces, servo means for controlling the ailerons, servo means for controlling the rudder, a single control means including means for setting in a desired angle of bank for controlling both said servo means to effect a desired bank of said craft and simultaneously a turn at a proportionate rate, and means for automatically modifying the preset rate of turn of the craft upon persisting aileron deflection to eliminate such deflection.

PERCY HALPERT.

REFERENCES CITED

The following references are of record in the file of this patent:

UNITED STATES PATENTS

| Number | Name | Date |
| --- | --- | --- |
| 2,190,391 | Thiry | Feb. 13, 1940 |
| 2,204,290 | Alkan | June 11, 1940 |
| 2,270,875 | Hanson et al. | Jan. 27, 1942 |
| 2,325,108 | Carlson | July 27, 1943 |
| 2,371,388 | Glenny | Mar. 13, 1945 |
| 2,380,425 | Frische et al. | July 31, 1945 |
| 2,415,430 | Frische et al. | Feb. 11, 1947 |
| 2,450,907 | Newton et al. | Oct. 12, 1948 |